United States Patent
Blankenship et al.

(10) Patent No.: US 8,250,435 B2
(45) Date of Patent: Aug. 21, 2012

(54) MEMORY ERROR DETECTION AND/OR CORRECTION

(75) Inventors: Robert G. Blankenship, Tacoma, WA (US); Dennis W. Brzezinski, Sunnyvale, CA (US); Edwin F. Mendez Valverde, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 464 days.

(21) Appl. No.: 12/559,953

(22) Filed: Sep. 15, 2009

(65) Prior Publication Data

US 2011/0066919 A1    Mar. 17, 2011

(51) Int. Cl.
*H03M 13/00* (2006.01)
(52) U.S. Cl. ........................... 714/758; 714/781
(58) Field of Classification Search ............. 714/758, 714/769, 767, 25, 763, 736, 777, 781, 768, 714/718; 365/201
See application file for complete search history.

(56) References Cited

U.S. PATENT DOCUMENTS

| | | | | |
|---|---|---|---|---|
| 6,874,116 B2 * | 3/2005 | Walker et al. | ................. | 714/763 |
| 7,203,890 B1 * | 4/2007 | Normoyle | .................... | 714/768 |
| 7,398,449 B1 * | 7/2008 | Normoyle et al. | ........... | 714/767 |
| 7,607,071 B2 * | 10/2009 | Neefs et al. | ................... | 714/785 |
| 8,099,651 B2 * | 1/2012 | Normoyle et al. | ............ | 714/767 |
| 2006/0174182 A1 | 8/2006 | Neefs et al. | | |
| 2007/0011562 A1 | 1/2007 | Alexander et al. | | |
| 2007/0089035 A1 | 4/2007 | Alexander et al. | | |

OTHER PUBLICATIONS

"Intel® E7500 Chipset MCH Intel®x4 Single Device Data Correction (x4 SDDC) Implementation and Validation", Application Note (AP-726), Revision 1.0, Intel, Aug. 2002, pp. 1-11.
"IBM Chipkill Memory—Advanced ECC Memory for the IBM Netfinity 7000 M10", Enhancing IBM Netfinity Server Reliability, © International Business Machines Corporation 1999, pp. 1-6.
Locklear, D. "Chipkill Correct Memory Architecture", Technology Brief, Dell Enterprise Systems Group, Aug. 2000, pp. 1-4.

* cited by examiner

*Primary Examiner* — Phung M Chung
(74) *Attorney, Agent, or Firm* — Christopher K. Gagne

(57) ABSTRACT

An embodiment may include circuitry that may detect and/or correct at least one error in a data codeword that may include a data word, cyclical redundancy check (CRC) word, and parity word. The circuitry may select whether a portion of the CRC word indicates whether only a single processor has accessed the data word. The data word, CRC word, and the parity word may be accessible in respective distinct memory device sets that each may include one or more respective memory devices. If the circuitry detects, based at least in part upon the data codeword and CRC word, a CRC error, and the at least one error includes fewer than a first predetermined number of errors, the circuitry may determine in which of the one or more respective memory devices in the memory device sets the at least one error resides and may correct the at least one error.

19 Claims, 2 Drawing Sheets

MEMORY ERROR DETECTION AND/OR CORRECTION

FIELD

This disclosure relates to memory error detection and/or correction.

BACKGROUND

In one type of conventional arrangement, a computer system includes a memory system. The memory system includes dual in-line memory modules (DIMM) that include dynamic random access memory (DRAM) devices. These DRAM devices typically are either 4 bits or 8 bits in width. The computer system also includes host processors that access the memory system. The host processors maintain local caches of data accessed in the memory system.

In this conventional arrangement, a fault in the memory system components may result in errors that may corrupt data written to or read from the memory system. In order to try to detect and/or correct such errors, the memory arrangement may implement error correction code (ECC) techniques. Also, in order to try to maintain data coherency of the local caches, the host processors employ a snoop message protocol.

In one such ECC technique, in each memory access, 8 ECC bits are associated with 64 data bits. Unfortunately, depending upon the particular configuration of the DIMM and width of the DRAM devices, the particular memory access modes that may be implementable in this conventional arrangement, consistent with and/or without reducing the arrangement's ECC capabilities, may be limited. Also, in this conventional arrangement, the snoop messages that may be sent between or among the host processors may consume undesirably large amounts of inter-processor processing and communication bandwidth. This may be especially true when such messages are communicated between or among processors that do not reside on the same processor die.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
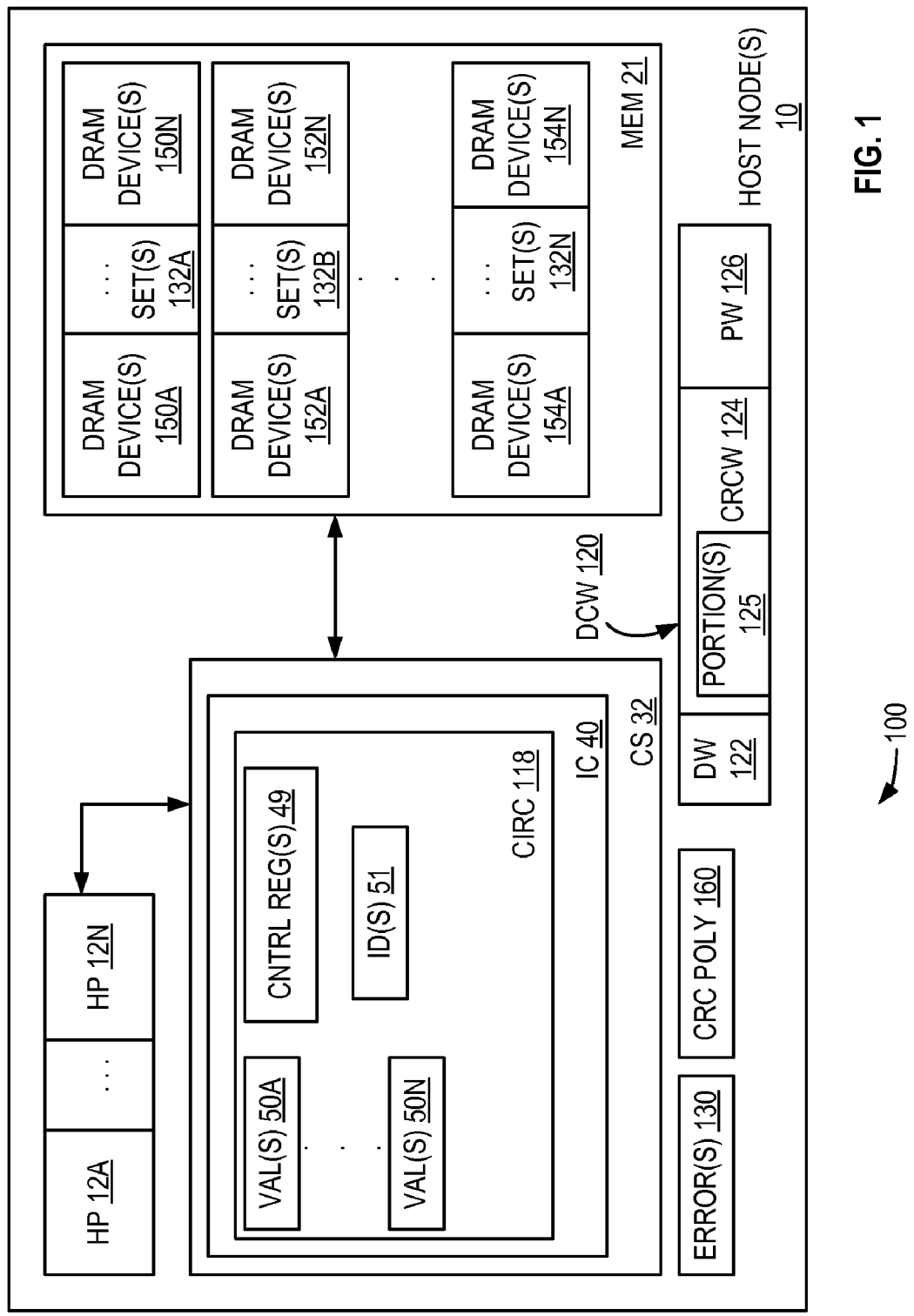
FIG. 1 illustrates a system embodiment.

FIG. 1 illustrates a system embodiment 100. System 100 may include one or more host nodes 10. In this embodiment, the term "host node," "host," and "node" may be used interchangeably, and may mean, for example, one or more end stations, appliances, intermediate stations, network interfaces, clients, servers, and/or portions thereof.

One or more hosts 10 may comprise one or more (and in this embodiment, a plurality of) host processors (HP) 12A . . . 12N, computer-readable/writable memory 21, and one or more chipsets (CS) 32. One or more CS 32 may comprise one or more integrated circuits (IC) 40. In this embodiment, each of the one or more IC 40 may be embodied as, for example, one or more semiconductor modules, chips, and/or substrates. One or more HP 12A . . . 12N may be communicatively coupled via one or more CS 32 to memory 21. One or more IC 40 and/or CS 32 may comprise circuitry 118. Alternatively, although not shown in the Figures, some or all of circuitry 118, one or more CS 32, and/or the functionality and components thereof may be comprised in, for example, one or more HP 12A . . . 12N. Additionally or alternatively, one or more HP 12A . . . 12N, and/or some or all of the functionality and/or components thereof may be comprised in, for example, circuitry 118 and/or one or more CS 32. As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry.

Each of the one or more HP 12A . . . 12N may comprise, for example, one or more processor cores comprised in one or more multi-core Intel® microprocessors commercially available from Intel Corporation. Of course, alternatively, each of the HP 12A . . . 12N may comprise one or more other types and/or configurations of microprocessor (e.g., manufactured and/or commercially available from a source other than Intel Corporation). In this embodiment, a "host processor," "processor," "processor core," and "core" may each comprise respective circuitry capable of performing, at least in part, one or more arithmetic and/or logical operations, such as, for example, one or more respective central processing units. Also in this embodiment, a "chipset" may comprise circuitry capable of communicatively coupling, at least in part, one or more HP, storage, mass storage, one or more nodes, and/or memory. Although not shown in the Figures, host node 10 may comprise a respective graphical user interface system that may be coupled to one or more CS 32. Each such graphical user interface system may comprise, e.g., a respective keyboard, pointing device, and display system that may permit a human user to input commands to, and monitor the operation of, one or more hosts 10 and/or system 100 via one or more CS 32. In this embodiment, "data" may comprise data and/or one or more commands and/or one or more instructions. Also in this embodiment, an "instruction" may include data and/or one or more commands.

One or more machine-readable program instructions may be stored in computer-readable/writable memory 21. In operation of one or more hosts 10, these instructions may be accessed and executed by one or more HP 12A . . . 12N, circuitry 118, one or more CS 32, and/or one or more components thereof. When so executed, these one or more instructions may result in one or more HP 12A . . . 12N, circuitry 118, one or more CS 32, and/or one or more components thereof, performing the operations described herein as being performed by one or more HP 12A . . . 12N, circuitry 118, one or more CS 32, and/or one or more components thereof.

In this embodiment, memory 21 may comprise a plurality of physically, logically, and/or functionally distinct sets of memory devices 132A . . . 132N. Each of the one or more respective memory device sets 132A . . . 132N may be or comprise one or more respective dynamic random access memory (DRAM) devices. For example, one or more sets 132A may be or comprise one or more respective DRAM devices 150A . . . 150N. Also, for example, one or more sets 132B may be or comprise one or more respective DRAM devices 152A . . . 152N. Additionally, for example, one or more more sets 132N may be or comprise one or more respective DRAM devices 154A ... 154N. Depending upon the particular operation and/or configuration of system 100, the DRAM devices in each of the sets 132A ... 132N may be or comprise either respective N-bits wide or twice N-bits wide (with N being a positive integer) devices. For example, in this embodiment, the respective DRAM devices in each one of the respective sets 132A ... 132N may be or comprise either respective 4-bits wide (e.g., capable of storing 4 respective bits) or 8-bits wide (e.g., capable of storing 8 respective bits) devices. In this embodiment, if the DRAM devices in each one of the respective sets 132A ... 132N are each N-bits wide, the DRAM devices may be accessible (for example, via memory access by one or more HP 12A ... 12N, one or more CS 32, and/or circuitry 118), depending upon other characteristics, functions, and/or operations of system 100 described below, in either independent channel mode or lock-step channel mode. Conversely, in this embodiment, if the DRAM devices in each one of the respective sets 132A ... 132N are each twice N-bits wide, the DRAM devices may be accessible, depending upon other characteristics, functions, and/or operations of system 100 described below, in lock-step channel mode. In this embodiment, independent channel mode may involve accessing one or more addresses in memory via one or more channels, in which the one or more addresses accessed via the one or more channels may be different from each other. Also in this embodiment, lock-step channel mode may involve contemporaneously accessing via at least two respective channels identical respective addresses in memory. Additionally, in this embodiment, a channel may comprise any modality (such as, for example, a bus) that may communicatively couple, at least in part, memory to an entity capable of accessing the memory. Additionally, in this embodiment, first entity may be "communicatively coupled" to a second entity if the first entity is capable, at least in part, of transmitting to and/or receiving from, and/or initiating, at least in part, transmitting to and/or receiving, the second entity one or more signals. In this embodiment, an access of memory may comprise, at least in part, reading, writing, manipulating, and/or otherwise modifying, at least in part, memory, and may involve (for example) one or more bus operations and/or transactions between memory and an entity accessing memory.

Of course, without departing from this embodiment, the number, type, size, configuration, and/or operation of one or more of the memory devices comprised in memory 21 may vary. For example, additionally or alternatively, memory 21 may comprise one or more of other and/or additional types of memories. These other and/or additional types of memories may include semiconductor firmware memory, programmable memory, non-volatile memory, read only memory, electrically programmable memory, random access memory, flash memory, magnetic disk memory, optical disk memory, and/or other or later-developed computer-readable and/or writable memory.

In this embodiment, each access of memory 21 may involve generation of a respective data code word (DCW). Each respective DCW may comprise a respective data word (DW), a respective cyclical redundancy code (CRC) word (CRCW), and a respective parity word (PW). For example, a respective read access of memory 21 by one or more HP 12A ... 12N, one or more CS 32, and/or circuitry 118 may result in retrieval from memory 21 of DCW 120 stored in memory 21. In this embodiment, DCW 120 may comprise DW 122, CRCW 124, and PW 126. Although the respective sizes of DCW, DW, CRCW, and PW may vary without departing from this embodiment, in this embodiment, DCW 120 may be 288-bits in size, DW 122 may be 256-bits in size, CRCW 124 may be 16-bits in size, and PW 126 may be 16-bits in size. As stored in memory 21, DW 122, CRCW 124, and PW 126 may be stored in respective distinct memory device sets in memory 21. For example, DW 122 may be stored in one or more respective memory device sets 132A, CRCW 124 may be stored in one or more respective memory device sets 132B, and PW 126 may be stored in one or more respective memory device sets 132N, respectively.

In this embodiment, the respective CRCW comprised in each respective DCW may be or comprise M-bits (M being a positive integer, e.g., 16-bits), and may be generated, based at least in part upon a respective CRC operation (e.g., a CRCW generation algorithm) that involves (e.g., uses as operands) the respective DW and a CRC generator polynomial 160. Polynomial 160 also may be M-bits (e.g., 16-bits) in size. In this embodiment, polynomial 160 may be represented as:

$$x^{16}+x^{15}+x^{11}+x^{10}+x^9+x^6+x^2+x+1.$$

In hexadecimal notation, polynomial 160 may be equivalently represented as: 0x18E47 hexadecimal. Other and/or additional CRC generator polynomials may be used without departing from this embodiment.

The respective CRCW in a respective DCW may be generated based upon and/or as a result of, at least in part, modulo 16-bit mapping onto the respective DW of the respective DCW, of the data of the respective DW stored respective DRAM devices in memory 21. In generating the respective CRCW, data stored in the DRAM devices that is comprised in the DW may be fed into the CRC algorithm on a whole DRAM device-by-DRAM device basis, and in accordance with a predetermined DRAM device order. Advantageously, in the event that one or more errors (e.g., one or more errors 130) are present in the respective DCW 120, and the one or more errors 130 comprises fewer than a predetermined number of errors, this may permit the circuitry 118 to determine in which of the one or more respective DRAM devices the one or more errors may reside. Also advantageously, in this embodiment, depending upon the particular configuration and/or operation of system 100 (e.g., the size of the DRAM devices and/or whether lock-step or independent channel mode is employed), this, in combination with the respective PW in the respective CRCW, may provide sufficient information to permit detection and/or correction by circuitry 118 (in a manner described below) of random 1-bit, 2-bit, odd-bit, and linearly mapped 16-bit continuous faults (errors) in the respective DCW. In this embodiment, if the DRAM devices in memory 21 comprise respective 4-bit wide DRAM devices accessed in lock-step channel mode, then circuitry 118 may be capable (based at least in part upon such information) of correcting errors occurring in a plurality of DRAM devices involved in the access. Conversely, in this embodiment, if the DRAM devices in memory 21 comprise respective 8-bit wide DRAM devices accessed in lock-step channel mode, or if the DRAM devices in memory 21 comprise respective 4-bit wide DRAM devices accessed in independent channel mode, then circuitry 118 may be capable (based at least in part upon such information) of correcting errors occurring in one or more DRAM devices involved in the access. In this embodiment, such error correction may be carried out on respective 32-bit portions of a respective DCW 120. That is, advantageously, the respective CRCW 124 and/or PW 126 may permit circuitry 118 to detect and/or correct one or more errors occurring in such respective 32-bit portions, on a respective portion-by-portion basis.

In this embodiment, the DRAM devices in memory 21 may be comprised in a plurality DIMM (not shown). If the DRAM devices in memory 21 comprise respective 4-bit wide DRAM devices, then each DIMM may have 18 DRAM devices and a respective access of a respective DCW may involve four respective bus transfers, with each of these bus transfers involving 72 respective bits. Conversely, if the DRAM devices in memory 21 comprise respective 8-bit wide DRAM devices, then each DIMM may have 9 DRAM devices and a respective access of a respective DCW may involve two respective bus transfers, with each of these bus transfers involving 144 respective bits.

The selection of whether to employ independent channel mode or lock-step channel mode in system 100 may be based at least in part upon one or more cost, design, functional, and/or operational considerations. For example, if it is desired that system 100 exhibit relatively higher memory access bandwidth and relatively reduced power consumption, independent channel mode, instead of lock-step channel mode, may be employed. Other configurations are possible without departing from this embodiment.

In this embodiment, PW 126 may be generated based at least in part upon an exclusive-or (XOR) of respective bits stored in the one or more DRAM devices 154A ... 154N with corresponding respective bits stored in corresponding respective DRAM devices of the other memory device sets (e.g., sets 132A and 132B) that store DW 122 and CRCW 124. For example, the $i^{th}$ bit of PW 126 (as stored in one or more DRAM devices 154A ... 154N) may be equal to an XOR of each of the respective $i^{th}$ bits of each respective DRAM device comprised in sets 132A and 132B.

In this embodiment, depending upon a selected mode of operation of system 100, a respective CRCW in a respective DCW may comprise one or more portions to indicate whether only a single HP has accessed (e.g., contemporaneously or previously) the respective DW of the respective DCW. Circuitry 118 may comprise one or more control registers 49 that may store one or more values to indicate in which selected mode of operation the system 100 is operating. For example, the one or more values stored in one or more control registers 49 may indicate that a respective CRCW (e.g., CRCW 124) generated by circuitry 118 may include one or more respective portions (e.g., one or more portions 125) to indicate (e.g., in the manner of or as a cache state directory) whether only a single one of the HP 12A ... 12N has accessed the respective DW (e.g., DW 122) of the respective DCW (e.g., DCW 120) that includes the respective CRCW 124. The one or more portions 125 may be or comprise, for example, at least one predetermined bit (e.g., the most significant bit) of the respective CRCW 124. In this case, the value of the one or more portions 125 may be included in the respective DW 122, as one or more predetermined additional portions (e.g., one or more additional predetermined bits) of the DW 122, and the circuitry 118 may generate the CRCW 124 based at least in part upon the DW 122 and these one or more predetermined bits. Advantageously, this may permit the CRCW 124 to afford CRC protection to these one or more predetermined bits. Also in this case, when (as is discussed below) the circuitry 118 re-generates the CRCW based at least in part upon the DW 122 and compares the re-generated CRCW to the CRCW 124, the circuitry 118 may ignore in such comparison the one or more portions 125 and the corresponding one or more portions of the re-generated CRCW. Alternatively, the one or more values stored in one or more control registers 49 may indicate that the respective CRWC 124 is not to include such one or more portions 125.

If the one or more values in the one or more control registers 49 indicate that the one or more portions 125 are included in the respective CRCW 124, the circuitry 118 and/or one or more HP 12A ... 12N may examine the one or more portions 125 to determine whether the one or more portions 125 indicate that only a single one of the HP 12A ... 12N (e.g., HP 12A) has accessed the respective DW 122. If the one or more portions 125 indicate that only a single processor 12A has accessed the respective DW 122, circuitry 118, and/or one or more HP other than HP 12A, may ignore one or more memory accesses related to and/or associated with the DCW 120 (e.g., that may have been indicated by way of "snoop" messages). Advantageously, this may reduce the bandwidth consumed by the one or more HP 12A ... 12N to process such messages, especially if such messages are communicated between or among processors that do not reside on and/or in the same HP processor die and/or socket. In this embodiment, if a cache state directory is employed, a snoop message may be sent, if appropriate, based on the directory state. The snooping protocol that may be employed in this embodiment may embrace, for example, data snap shot ("cur snoop"), read only copy ("code snoop"), read only or exclusive copy ("data snoop"), or exclusive copy ("invalidating snoop") techniques. Accordingly, in this embodiment, the terms "snooping," "snoop message," "snoop protocol," "cache snoop," and related terms are intended to embrace all such (and/or other) alternatives and variations.

Conversely, in this embodiment, if host node 10 only comprises a single HP (e.g., HP 12A), the one or more values stored in the one or more control registers 49 may select a mode of operation of system 100 in which the respective CRCW 124 does not include one or more portions 125. Advantageously, this may reduce the amount of processing bandwidth consumed in system 100 to implement CRCW 124. As stated above, in this embodiment, whether the one or more portions 125 are included in the respective CRCW 124 is selectable by the circuitry 118 (e.g., by storing the one or more values in one or more control registers 49 in response at least in part to one or more commands provided to the circuitry 118 from a human user, program process, etc.). Advantageously, this improves the flexibility, adaptability, and utility of this embodiment.

Figure 2:
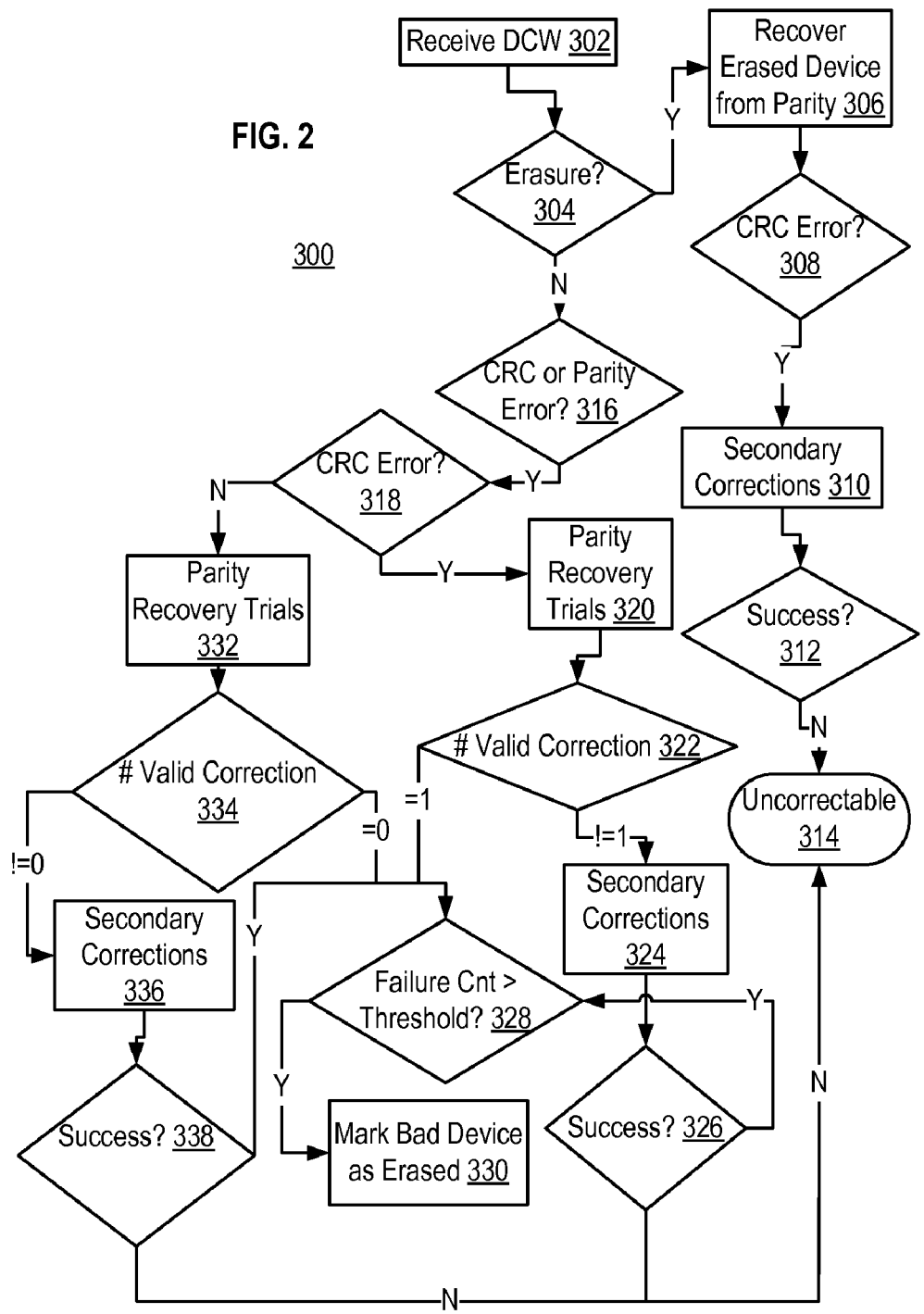
FIG. 2 illustrates operations in an embodiment.

With particular reference now being made to FIGS. 1 and 2, operations 300 (see FIG. 2) that may be performed in system 100 will be described. Although operations 300 will be described in reference to an access by circuitry 118 of memory 21 that comprises a read of memory 21, it should be appreciated that, without departing from this embodiment, such access may comprise a write of memory 21 by circuitry 118. Likewise, although operations 300 will be described in reference to the DRAM devices in memory 21 being 4-bits wide, other configurations (including those described above) are possible without departing from this embodiment. Those of ordinary skill in the art will appreciate that the principles involved, according to this embodiment, with a read of memory 21 that are described below may be applied and/or used, after being modified, at least in part, in ways apparent to those of ordinary skill in the art, to and/or in other configurations and/or operational environments, without departing from this embodiment. After, for example, a reset of one or more hosts 10, a human user (not shown) of one or more hosts 10 may issue via the not shown graphic user interface system one or more commands that may result in circuitry 118 accessing memory 21. This may result in circuitry 118 retrieving and/or receiving DCW 120 from the DRAM devices in memory 21, as illustrated by operation 302 in FIG. 2. Thereafter, circuitry 118 may determine based at least in part upon identification information 51 that may be stored in circuitry 118 whether one or more DRAM devices in memory 21 have previously been identified (e.g., in the manner described below) by circuitry 118 as being bad (e.g., defective), and therefore, have been previously erased by circuitry 118 (see operation 304). If circuitry 118 determines that the access of memory 21 involved (e.g., DCW 120 was retrieved at least in part from) one or more such previously identified bad DRAM devices, circuitry 118 may try to recover (e.g., using PW 126 and parity-based recovery techniques) the data retrieved from one or more such previously identified bad DRAM devices (see operations 306). If this recovery attempt is successful (e.g., the data is recoverable within the error correction capabilities of the PW 126 and such parity-based recovery techniques), circuitry 118 may re-generate CRCW 124 using the DW 122, and may compare the re-generated CRCW 124 to the original CRCW 124 from the retrieved DCW 120 to detect whether one or more CRC errors (e.g., one or more errors 130) are present in DW 122. Such comparison and/or re-generation may be based upon DW 122 and/or original CRCW 124 modified, if appropriate, to reflect the data recovered (if any) as a result of operation 306. If circuitry 118 determines that no CRC errors are present, circuitry 118 may determine that the DCW 120 is "clean" (e.g., free from error) and processing by one or more HP 12A . . . 12N of DCW 120 may proceed.

Conversely, if circuitry 118 detects that one or more CRC errors are present, circuitry 118 may carry out secondary corrections based at least in part upon the CRCW 124, as illustrated by operation 310. In general, given the error correction limitations of the CRCW 124 and the previous use of the PW 126 in data recovery in operation 306, such secondary corrections may correct at most one additional bit error in DW 122 derived from a DRAM device other than the one or more previously identified bad DRAM devices that were involved in the retrieval of DCW 120. Thus, in this scenario, if the number of CRC errors comprises fewer than a predetermined number of such errors (in this case, two such errors), circuitry 118 may be capable of correcting the single CRC error and also may be capable of determining in which of the DRAM devices in memory 21 that CRC error resides. In such case, such secondary corrections may be deemed successful (see operation 312) by circuitry 118, and the DCW 120 may be deemed corrected and/or "cleaned" by circuitry 118 and processing by one or more HP 12A . . . 12N of DCW 120 may proceed. Conversely, if the number of CRC errors is greater than or equal to this predetermined number, such secondary corrections may be unsuccessful (see operation 312), and circuitry 118 may determine that such errors are uncorrectable (see operation 314). This may result in the circuitry 118 indicating to one or more HP 12A . . . 12N that DCW 120 is poisoned (e.g., contains one or more errors that are uncorrectable).

Returning to operation 304, if no such previously identified bad DRAM device was involved in the retrieval of DCW 120 from memory 21, circuitry 118 may detect, based at least in part upon CRCW 124, PW 126, and DW 122, whether DCW 120 comprises one or more CRC errors and/or one or more parity errors (see operation 316). If circuitry 118 detects that one or more CRC errors and/or one or more parity errors (e.g., as comprised in one or more errors 130) are present, circuitry 118 may determine whether such one or more detected errors comprises one or more CRC errors (see operation 318). If circuitry 118 determines that such one or more detected errors do not comprise one or more CRC errors, circuitry 118 may carry out parity-based recovery trials, as illustrated by operation 332. Such recovery trials may involve utilizing, at least in part, PW 126 and parity-based data recovery techniques, to attempt to correct the one or more errors present in DCW 120 by attempting to recover, for each of the DRAM devices involved in the retrieval of DCW 120, and on a DRAM device-by-DRAM device basis, the respective data stored in each of these respective DRAM devices, and using the CRCW 124 to determine in which of the DRAM devices the one or more errors reside. For example, such parity-based recovery techniques may attempt to recover an erroneous bit (e.g., the $i^{th}$ bit of a given DRAM device involved in the retrieval of the DCW 120) by performing a logical XOR of the respective $i^{th}$ bits of each of the other DRAM devices (i.e., other than the given DRAM device, and including the device(s) that contain the PW) involved in the retrieval of the DCW 120. Of course, without departing from this embodiment, both the calculation of the PW 126 and the recovery of the one or more errors may be based upon performance of logical XNOR (i.e., negative XOR), instead of logical XOR.

If circuitry 118 determines, based at least in part upon these recovery trials, that the number of valid bit corrections resulting from such trials is equal to zero, the circuitry 118 may determine that the one or more errors resides at least in part in the PW 126, and therefore, also resides at least in part in the one or more DRAM devices 154A . . . 154N that store the PW 126 (see operation 334). In this scenario, in which the respective data implicated by the one or more errors is stored in one or more DRAM devices 154A . . . 154N, circuitry 118 may increment one or more values 50A (e.g., initially set to zero) stored in circuitry 118 that may indicate the number of times that one or more DRAM devices 154A . . . 154N have failed (e.g., contained at least one error). Circuitry 118 then may compare these one or more values 50A to one or more predetermined threshold values, and if the one or more values 50A exceeds the one or more predetermined values (see operation 328), circuitry 118 may modify identification information 51 to indicate, as bad, one or more DRAM devices 154A . . . 154N and also may erase one or more DRAM devices 154A . . . 154N (see operation 330). Circuitry 118 and/or one or more other components of one or more nodes 10 may execute, at least in part, software that may read these one or more values 50A and/or information 51, and may perform, at least in part, this comparison. In this case, circuitry 118 may not use in the future parity word information to detect and/or correct error in future respective DCW. Alternatively, in this case, circuitry 118 may redirect future data accesses involving one or more respective PW that would have otherwise been directed to one or more DRAM devices 154A . . . 154N to one or more other DRAM devices (e.g., one or more DRAM devices 152N) that are not being used to store data. Regardless of the outcome of the decision of operation 328, after executing operation 328, DCW 120 may be deemed corrected and/or "cleaned" by circuitry 118 and processing by one or more HP 12A . . . 12N of DCW 120 may proceed.

Conversely, if circuitry 118 determines, in operation 334, based at least in part upon these recovery trials, that the number of valid bit corrections resulting from such trials is not equal to (e.g., greater than) zero, circuitry 118 may carry out secondary corrections based at least in part upon the CRCW 124, as illustrated by operation 336. In general, in this scenario, such secondary corrections may correct at most a combination of one or more errors resulting from a failed DRAM device together with one additional bit error in DW 122 derived from a DRAM device other than from the failed DRAM device. Thus, in this scenario, since the one or more DRAM devices that store the PW 126 have been determined to have failed, if the number of errors present in one or more errors 130 additionally comprises at most this single bit error (and no other DRAM devices are implicated as failed), circuitry 118 may be capable of correcting the one or more errors 130. In such case, such secondary corrections may be deemed successful (see operation 338) by circuitry 118, and processing by circuitry 118 may continue with operation 328 in the manner described previously. Otherwise, circuitry 118 may determine as a result of operation 338 that such errors are uncorrectable, and processing by circuitry 118 may continue in the manner described above in connection with operation 314.

Returning to operation 318, conversely, if circuitry 118 determines (as a result of operation 318) that such one or more detected errors 130 comprise one or more CRC errors, circuitry 118 may carry out parity-based recovery trials, as illustrated by operation 320. Such recovery trials may involve operations of the type described previously in connection with operation 332.

If circuitry 118 determines, based at least in part upon the recovery trials executed as a result of operation 320, that the number of valid bit corrections resulting from such trials is fewer than a predetermined number (in this case, two), and in fact, is equal to 1 (i.e., unity), the circuitry 118 may determine, based at least in part upon the trials and the CRCW 124, in which of the DRAM devices the one or more errors 130 reside and may correct the one or more errors 130. Circuitry 118 then may increment one or more respective values (e.g., one or more values 50N, initially set to zero) in circuitry 118 that may indicate the number of times that the one or more DRAM devices (e.g., 150A) have failed. In this scenario, in which the respective data implicated by the one or more errors is stored at least in part in one or more DRAM devices 150A, circuitry 118 may compare these one or more values 50N to one or more predetermined threshold values, and if the one or more values 50N exceeds the one or more predetermined values (see operation 328), circuitry 118 may modify identification information 51 to indicate, as bad, one or more DRAM devices 150A and also may erase one or more DRAM devices 150A (see operation 330). As discussed previously in connection with one or more DRAM devices 154A ... 154N, in this case, circuitry 118 may redirect future data accesses that would have otherwise been directed to one or more DRAM devices 150A to one or more other DRAM devices (e.g., one or more DRAM devices 152N) that are not being used to store data. Regardless of the outcome of the decision of operation 328, after executing operation 328, DCW 120 may be deemed corrected and/or "cleaned" by circuitry 118 and processing by one or more HP 12A ... 12N of DCW 120 may proceed.

Conversely, if circuitry 118 determines, in operation 322, based at least in part upon these recovery trials, that the number of valid bit corrections resulting from such trials is not equal to (e.g., greater than) 1, circuitry 118 may carry out secondary corrections based at least in part upon the CRCW 124, as illustrated by operation 324. In general, in this scenario, such secondary corrections may correct at most a combination of one or more errors resulting from a failed DRAM device together with one additional bit error in DW 122 derived from a DRAM device other than from the failed DRAM device. Thus, in this scenario, if the number of errors present in one or more errors 130 is fewer than this predetermined number of errors, circuitry 118 may be capable of correcting the one or more errors 130. In such case, such secondary corrections may be deemed successful (see operation 326) by circuitry 118, and processing by circuitry 118 may continue with operation 328 in the manner described previously. Otherwise, circuitry 118 may determine as a result of operation 326 that such errors exceed the predetermined number of errors that are correctable, and therefore, that such errors are uncorrectable, and processing by circuitry 118 may continue in the manner described above in connection with operation 314.

Advantageously, in this embodiment, depending upon, e.g., whether lock-step or independent channel mode is employed, circuitry 118 may be capable of providing single device data correction for configurations involving either 4-bit or 8-bit DRAM devices, and also may be capable of providing double device data correction for configurations involving 4-bit DRAM devices. Also advantageously, in this embodiment, circuitry 118 may be capable of reducing the risk of silent data corruption. Further advantageously, the circuitry 118 of this embodiment may exhibit improved double device fault error correction and detection.

In this embodiment, if system 100 uses 4-bit wide DRAM devices and those devices are operated in lock-step channel mode, respective bits of a respective 16-bit PW may be divided into two respective portions comprising 8-bits each. One of these two respective portions may be used for detecting and/or correcting one or more errors arising from even DRAM addresses, and the other of these two portions may be used for detecting and/or correcting one or more errors arising from odd DRAM addresses. In this configuration, after circuitry 118 detects, as a result at least in part of recovery trials, a failure of (e.g., an error in) a DRAM device, circuitry 118 may record this information in information 51. Thereafter, if a respective DCW includes one or more errors, circuitry 118 may attempt to recover and/or correct, in response at least in part to the detection of these one or more errors, the respective data stored in the DRAM device that was previously determined to have failed, before attempting to determine whether the one or more errors implicates other respective data in one or more other respective DRAM devices. The attempt to recover and/or correct this respective data in the failed DRAM device may be based at least in part upon the appropriate one of the two 8-bit portions of the respective PW.

Alternatively, if system 100 uses 4-bit wide DRAM devices and those devices are operated in lock-step channel mode, a respective PW may be reduced to 8 bits and/or a respective CRCW may be reduced to 8 bits. This may permit one or more DRAM devices may be initially unused for storing the respective DCW. In this alternative, circuitry 118 may be capable of detecting 8 erroneous bits, from two accesses, from a failed DRAM device. After failed devices are identified as failed, accesses to data that otherwise would be directed to the failed devices may be instead redirected to the one or more initially unused devices.

Thus, an embodiment may include circuitry that may detect and/or correct at least one error in a data codeword that may include a data word, cyclical redundancy check (CRC) word, and parity word. The circuitry may select whether a portion of the CRC word indicates whether only a single processor has accessed the data word. The data word, CRC word, and the parity word may be accessible in respective distinct memory device sets that each may include one or more respective memory devices. If the circuitry detects, based at least in part upon the data codeword and CRC word, a CRC error, and the at least one error includes fewer than a first predetermined number of errors, the circuitry may determine in which of the one or more respective memory devices in the memory device sets the at least one error resides and may correct the at least one error.

Many variations, alternatives, and modifications are possible without departing from this embodiment. For example, depending upon the particular configuration and/or operation of system 100, the particular mapping of the respective data stored in the DRAM devices to the respective CRCW of a respective DCW may vary. Also, for example, in the case of a write of DCW 120 to memory 21, circuitry 118 may generate and store in memory 21 DW 122, CRCW 124, and/or PW 126 in accordance with the above teachings. Of course, many other and/or additional variations, alternatives, and modifications will be apparent to those of ordinary skill in the art. The accompanying claims are intended to encompass all such variations, alternatives, and modifications.

What is claimed is:

1. An apparatus comprising:
   circuitry to perform at least one of the following subparagraphs (a) and (b):
   (a) detect at least one error in a data codeword; and
   (b) correct the at least one error in the data codeword;
   the data codeword including a data word, a cyclical redundancy check (CRC) word, and a parity word;
   the circuitry being to determine whether a portion of the CRC word indicates that only a single processor has accessed the data word;
   the data word, the CRC word, and the parity word being accessible in respective distinct memory device sets, each of the sets comprising one or more respective memory devices; and
   if the circuitry detects, based at least in part upon the data word and the CRC word, a CRC error, and the at least one error comprises fewer than a first predetermined number of errors, the circuitry determines in which of the one or more respective memory devices in the memory device sets the at least one error resides and corrects at least one error.

2. The apparatus of claim 1, wherein:
   the parity word is stored in at least one memory device; and
   if, based at least in part upon the data word, the CRC word, and the parity word, the circuitry detects a parity error, and the at least one error resides at least in part in the parity word, the circuitry is to correct the at least one error and to increment a value indicating a number of times that the at least one memory device has failed.

3. The apparatus of claim 1, wherein:
   the CRC word is N-bits in length, N being a positive integer;
   the portion of the CRC word comprises at least one predetermined bit in the CRC word; and
   the CRC word is generated based at least in part upon a CRC operation involving the data word, the at least one predetermined bit, and an N-bit CRC generator polynomial.

4. The apparatus of claim 1, wherein:
   the CRC word is stored in at least one memory device;
   the data word is stored in at least one other memory device;
   the parity word is generated based at least in part upon an exclusive-OR of respective bits stored in the at least one memory device with corresponding respective bits stored in the at least one other memory device.

5. The apparatus of claim 4, wherein:
   the apparatus comprises a plurality of memory devices; and
   after the circuitry detects the CRC error, the circuitry attempts to recover, based at least in part upon at least a portion of the parity word, the CRC word, and the data word, respective data implicated by the at least one error.

6. The apparatus of claim 5, wherein:
   each of the plurality of memory devices comprises one or more respective dynamic random access memory (DRAM) devices, each of the DRAM devices being one of N-bits wide and twice N-bits wide, N being a positive integer;
   the DRAM devices are accessible in independent channel mode if each of the DRAM devices is N-bits wide; and
   the DRAM devices are accessible in lock-step channel mode if each of the DRAM devices is the one of N-bits wide and twice N-bits wide.

7. The apparatus of claim 6, wherein:
   the DRAM devices are accessed in the lock-step channel mode;
   each of the DRAM devices is N-bits wide;
   the parity word comprises a first N-bit portion and a second N-bit portion;
   the respective data implicated by the at least one error is stored in a certain one of the DRAM devices; and
   if a previous error involving the certain one of the DRAM devices was detected, the circuitry attempts to recover, in response at least in part to detecting the at least one error and based at least in part upon the first N-bit portion, the respective data stored in the certain one of the DRAM devices, before attempting to determine whether the at least one error implicates other respective data in another DRAM device.

8. The apparatus of claim 6, wherein:
   the apparatus further comprises the memory device sets and one or more host processors;
   the circuitry is comprised, at least in part, in a chipset to be coupled to the one or more processors;
   the DRAM devices are accessed in the lock-step channel mode;
   each of the DRAM devices is N-bits wide;
   the parity word and the CRC word are each twice N-bits in size;
   the respective data implicated by the at least one error is stored in a certain one of the DRAM devices;
   after the certain one of the DRAM devices has been determined to have been involved in the at least one error, a value is incremented that indicates a number of times that the certain one of the DRAM devices has failed; and
   after the value exceeds a predetermined value, a data access that would have otherwise been directed to the certain one of the DRAM devices is instead directed to another one of the DRAM devices.

9. The apparatus of claim 1, wherein:
   the circuitry comprises one or more registers to store one or more values to select whether the portion of the CRC word is included in the CRC word; and
   if the portion of the CRC word indicates that only the single processor has accessed the data word, at least one of the circuitry and one or more other processors ignores one or more memory accesses associated with the data codeword.

10. The apparatus of claim 9, wherein:
    the one or more memory accesses are indicated by one or more snoop messages.

11. A method comprising:
    at least one of the following subparagraphs (a) and (b):
    (a) detecting, by circuitry, at least one error in a data codeword; and
    (b) correcting, by the circuitry, the at least one error in the data codeword;
    the data codeword including a data word, a cyclical redundancy check (CRC) word, and a parity word;
    the circuitry being to determine whether a portion of the CRC word indicates that only a single processor has accessed the data word;
    the data word, the CRC word, and the parity word being accessible in respective distinct memory device sets, each of the sets comprising one or more respective memory devices; and if the circuitry detects, based at least in part upon the data word and the CRC word, a CRC error, and the at least one error comprises fewer than a first predetermined number of errors, the method also comprising determining by the circuitry in which of the one or more respective memory devices in the memory device sets the at least one error resides and correcting the at least one error.

12. The method of claim 11, further comprising:

storing the parity word in at least one memory device; and if, based at least in part upon the data word, the CRC word, and the parity word, the circuitry detects a parity error, and the at least one error resides at least in part in the parity word, the circuitry corrects the at least one error and to increment a value indicating a number of times that the at least one memory device has failed.

13. The method of claim 11, wherein:

the CRC word is N-bits in length, N being a positive integer;

the portion of the CRC word comprises at least one predetermined bit in the CRC word; and the method further comprises generating the CRC word based at least in part upon a CRC operation involving the data word, the at least one predetermined bit, and an N-bit CRC generator polynomial.

14. The method of claim 11, wherein:

the CRC word is stored in at least one memory device;

the data word is stored in at least one other memory device; and the method further comprises generating the parity word based at least in part upon an exclusive-OR of respective bits stored in the at least one memory device with corresponding respective bits stored in the at least one other memory device.

15. The method of claim 14, wherein:

the method further comprises, after the circuitry detects the CRC error, the circuitry attempts to recover, based at least in part upon at least a portion of the parity word, the CRC word, and the data word, respective data implicated by the at least one error.

16. Computer-readable memory storing instructions that when executed by a machine result in operations comprising:

at least one of the following subparagraphs (a) and (b):

(a) detecting, by circuitry, at least one error in a data codeword; and (b) correcting, by the circuitry, the at least one error in the data codeword;

the data codeword including a data word, a cyclical redundancy check (CRC) word, and a parity word;

the circuitry being to determine whether a portion of the CRC word indicates that only a single processor has accessed the data word;

the data word, the CRC word, and the parity word being accessible in respective distinct memory device sets, each of the sets comprising one or more respective memory devices; and if the circuitry detects, based at least in part upon the data word and the CRC word, a CRC error, and the at least one error comprises fewer than a first predetermined number of errors, the operations also comprising determining by the circuitry in which of the one or more respective memory devices in the memory device sets the at least one error resides and correcting the at least one error.

17. The computer-readable memory of claim 16, wherein:

the parity word is stored in at least one memory device; and if, based at least in part upon the data word, the CRC word, and the parity word, the circuitry detects a parity error, and the at least one error resides at least in part in the parity word, the circuitry is to correct the at least one error and to increment a value indicating a number of times that the at least one memory device has failed.

18. The computer-readable memory of claim 16, wherein:

the CRC word is N-bits in length, N being a positive integer;

the portion of the CRC word comprises at least one predetermined bit in the CRC word; and the CRC word is generated based at least in part upon a CRC operation involving the data word, the at least one predetermined bit, and an N-bit CRC generator polynomial.

19. The computer-readable memory of claim 16, wherein:

the CRC word is stored in at least one memory device;

the data word is stored in at least one other memory device;

the parity word is generated based at least in part upon an exclusive-OR of respective bits stored in the at least one memory device with corresponding respective bits stored in the at least one other memory device.

* * * * *